US006986145B2

(12) United States Patent
Gangopadhyay

(10) Patent No.: US 6,986,145 B2
(45) Date of Patent: Jan. 10, 2006

(54) IN-CONTEXT ACCESS TO RELEVANT SERVICES FROM MULTIPLE APPLICATIONS AND INFORMATION SYSTEMS BY OBJECT SCHEMA TRAVERSAL

(76) Inventor: Dipayan Gangopadhyay, 6551 Timberview Dr., San Jose, CA (US) 95120

( * ) Notice: Subject to any disclaimer, the term of this patent is extended or adjusted under 35 U.S.C. 154(b) by 786 days.

(21) Appl. No.: 10/098,051

(22) Filed: Mar. 12, 2002

(65) Prior Publication Data

US 2002/0184402 A1   Dec. 5, 2002

Related U.S. Application Data

(60) Provisional application No. 60/275,791, filed on Mar. 13, 2001.

(51) Int. Cl.
*G06F 9/00*   (2006.01)
(52) U.S. Cl. .................... 719/316; 707/102; 705/7; 705/8; 705/9; 715/811; 715/817
(58) Field of Classification Search ............... 719/315, 719/316; 707/102–104.1; 717/113; 705/7–10; 715/811, 817
See application file for complete search history.

(56) References Cited

U.S. PATENT DOCUMENTS

2002/0144233 A1 * 10/2002 Chong et al. ............... 717/105
2002/0154178 A1 * 10/2002 Barnett et al. .............. 345/853

* cited by examiner

*Primary Examiner*—St. John Courtenay, III
*Assistant Examiner*—Charles Anya

(57) ABSTRACT

Composite applications combine services from plurality of existing applications and information sources. Via user interface of such a composite application, an end-user wants to access different combinations of existing services in different usage contexts. This invention describes a method and apparatus for dynamically combining existing services without having to program case-by-case for each usage context. In this method, one constructs and stores a graph of object types and relationships among parameters of existing services and the objects of a composite application. By traversing paths in the stored graph, the apparatus (1) dynamically constructs menus of services relevant to any usage context, (2) automatically computes necessary inputs to a service selected from a menu and executes the service, and (3) automatically propagates changes and invokes appropriate services whenever objects are updated. The net result is the avoidance of case-by-case programming done in the prior art to construct composite applications.

2 Claims, 7 Drawing Sheets

Components of Apparatus

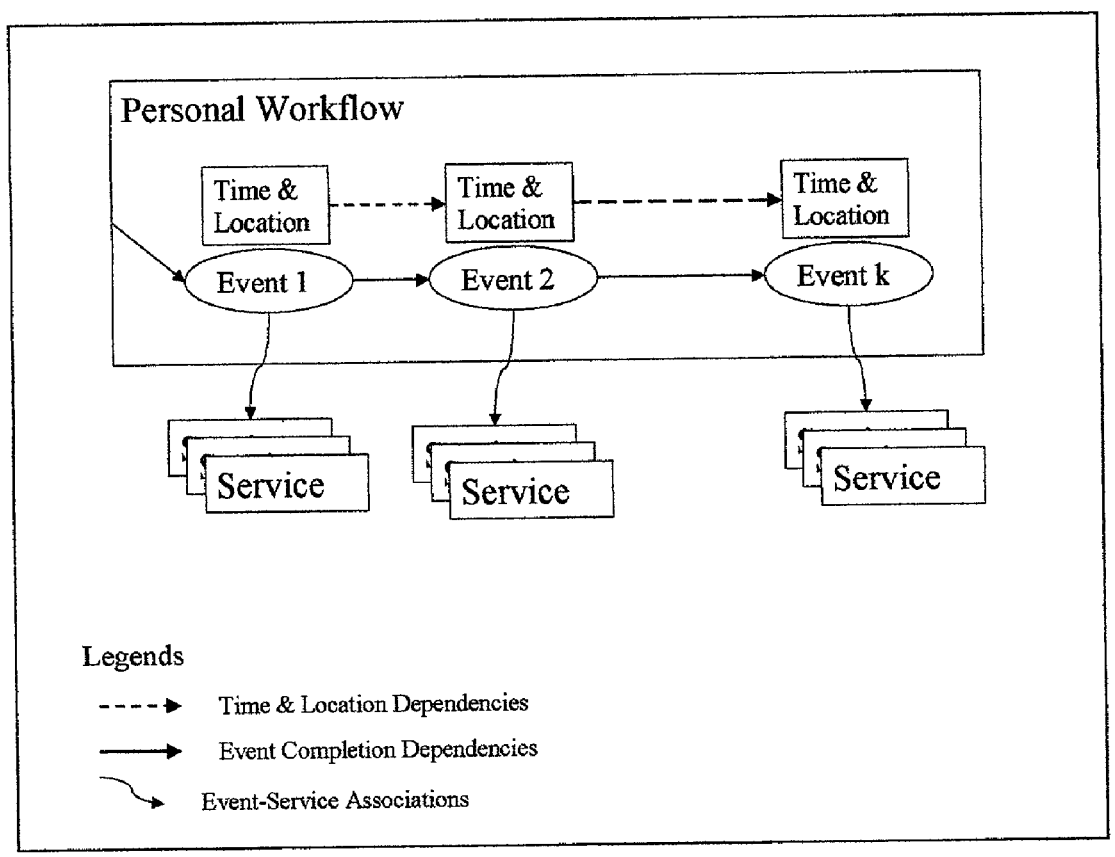
Figure 1 Overview of Entities in a Personal Workflow

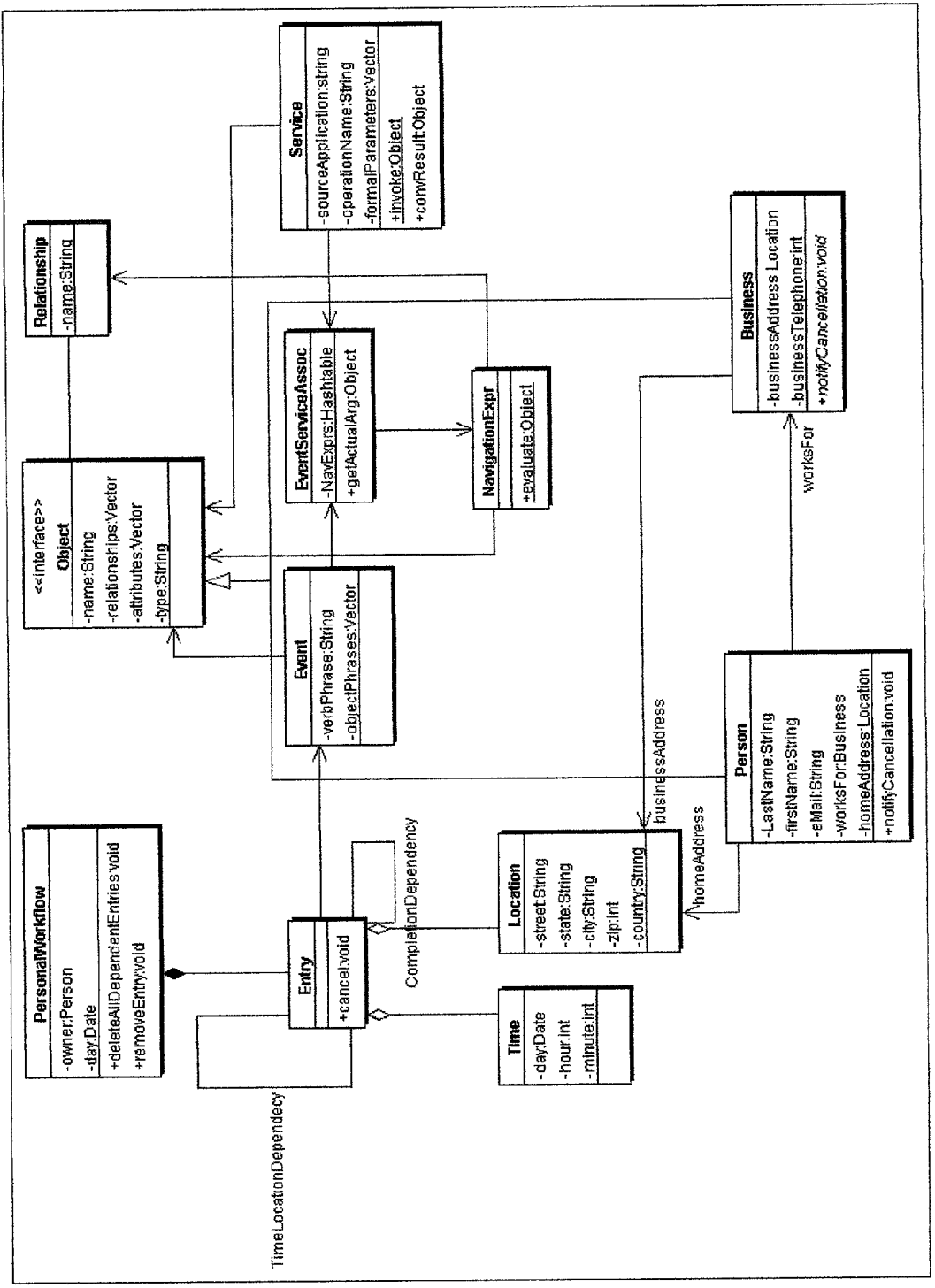
Figure 2 Context Object Schema in UML Notation

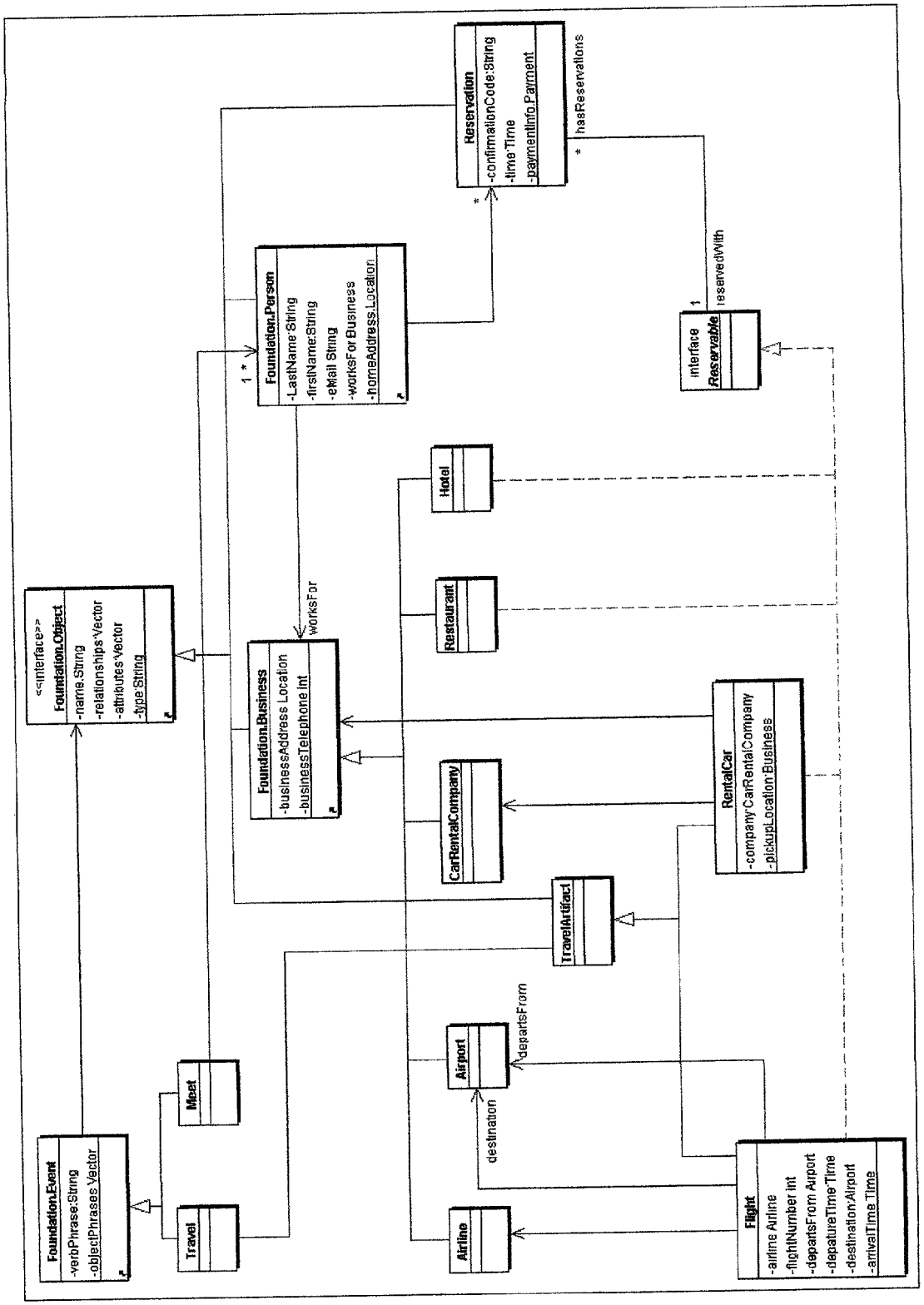
Figure 3 A Non-Exhaustive Object Schema for Travel Domain

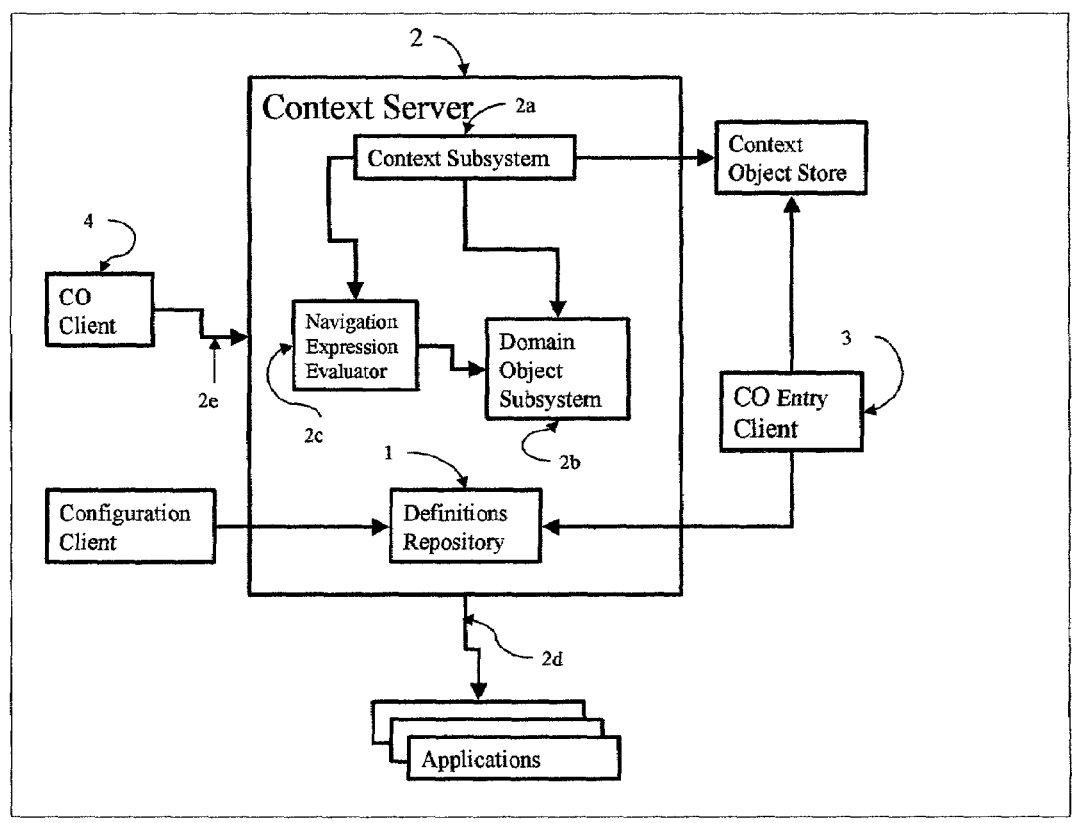
Figure 4 Components of Apparatus

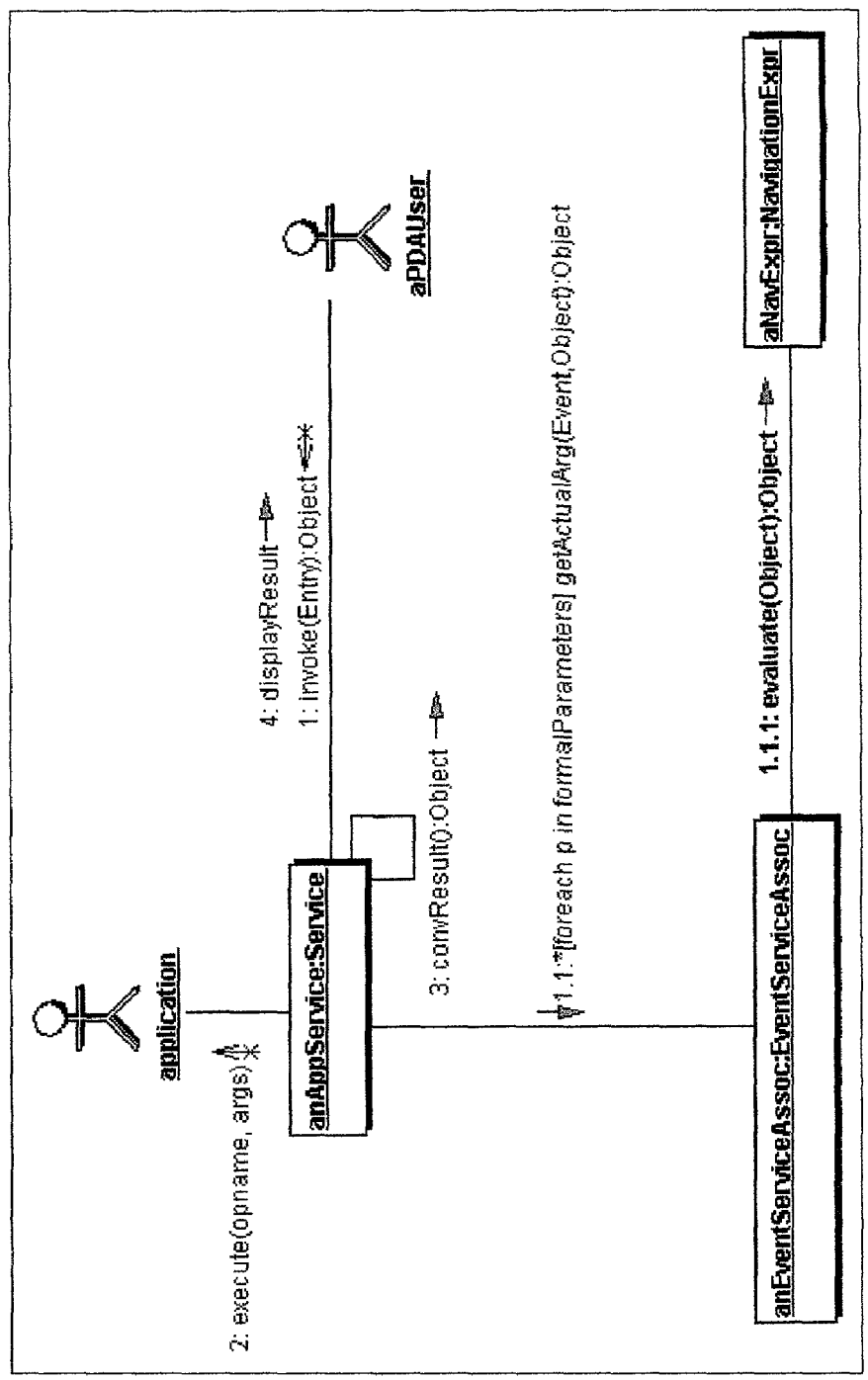
Figure 5 Context Server Operations for an Application Service Invocation

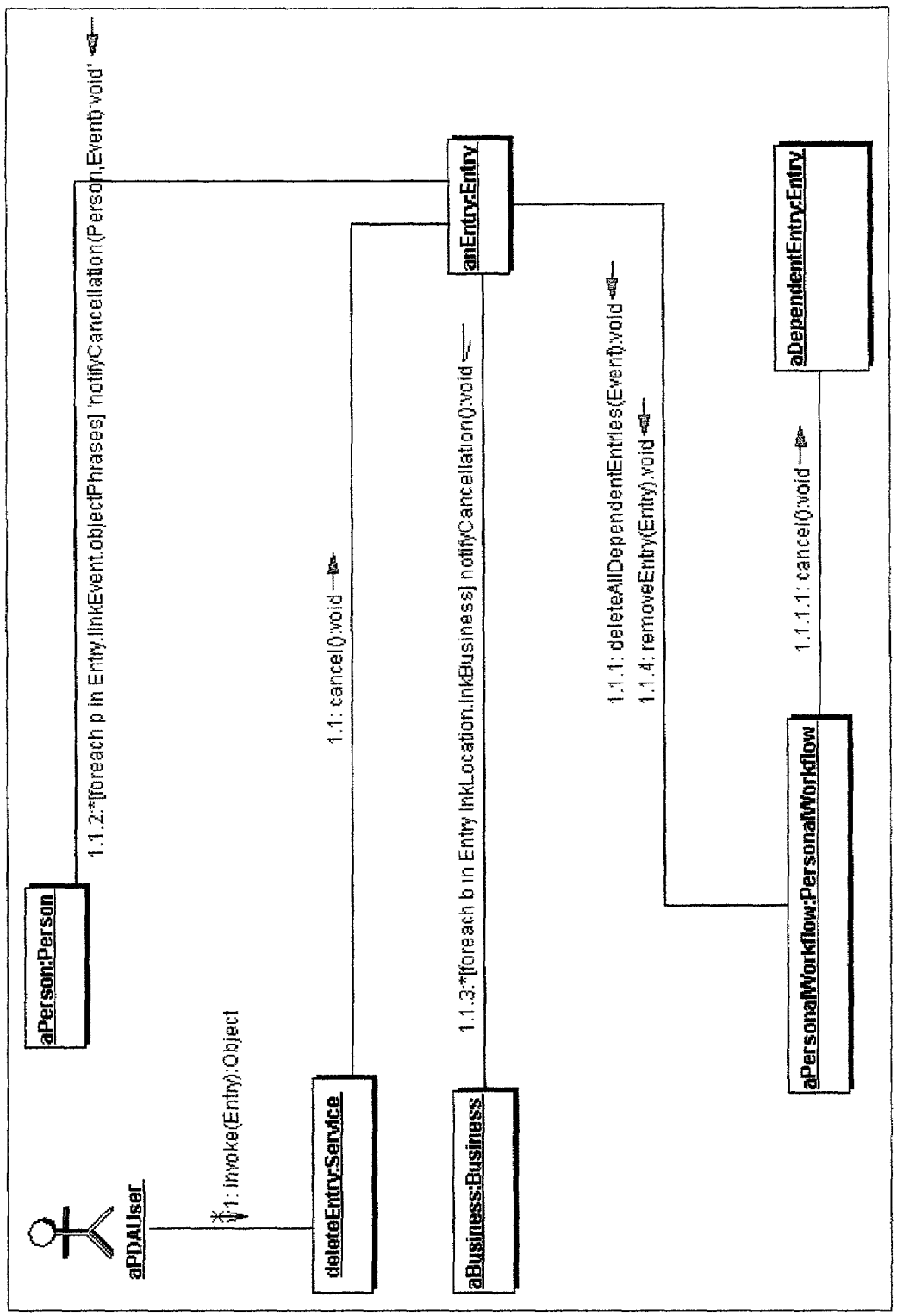
Figure 6 Context Server Operations for Deleting An Entry

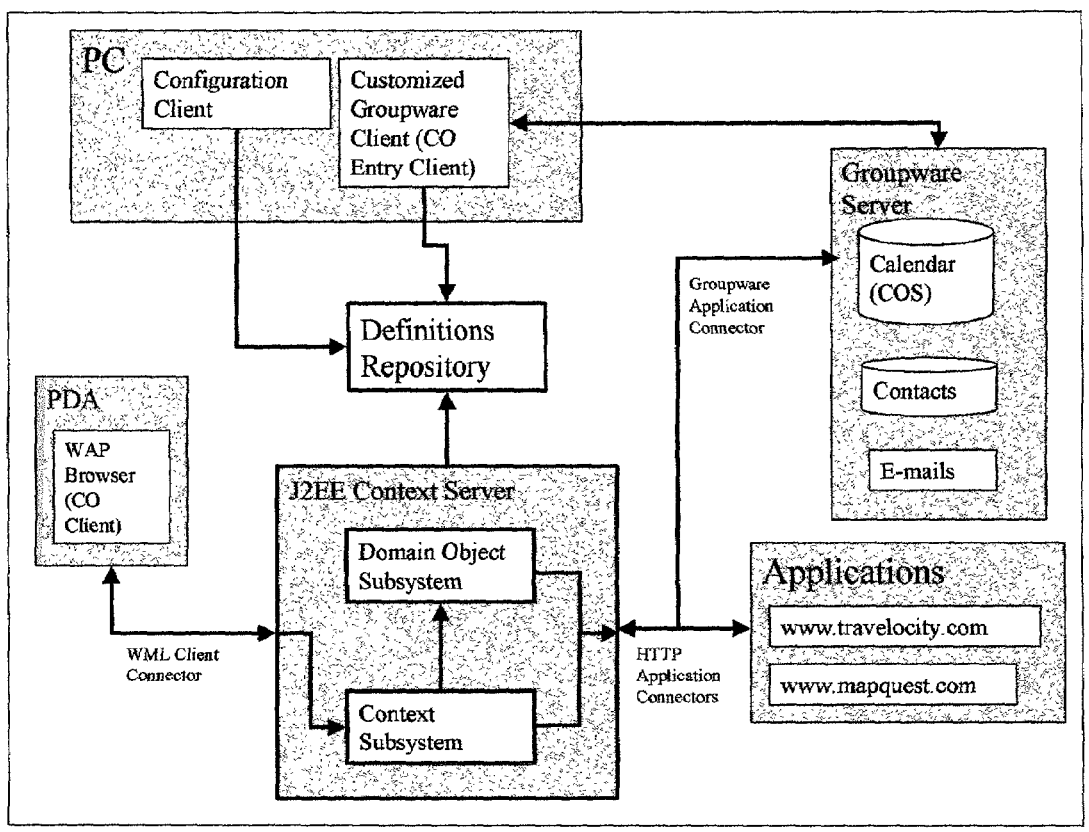
Figure 7 Preferred Embodiment of the Invention ature or content="text/xml; charset=UTF-8">

IN-CONTEXT ACCESS TO RELEVANT SERVICES FROM MULTIPLE APPLICATIONS AND INFORMATION SYSTEMS BY OBJECT SCHEMA TRAVERSAL

1. CROSS REFERENCE TO RELATED APPLICATION

This application is entitled to the benefit of Provisional Patent Application Ser. No. 60/275,791, filed Mar. 13, 2001.

2. BACKGROUND—FIELD OF INVENTION

This invention relates to computerized methods and apparatuses for in-context access to existing functions of multiple applications and information systems, from a new composite application or from an extended user interface of an existing application.

3. BACKGROUND—DISCUSSION OF PRIOR ART

With the advent of Web, many functional and information services are available. For example, credit card processing, ordering merchandise, trading stocks as well as numerous product catalogs, pricing information and news are available on the Web. These services together with functions from existing enterprise applications such CRM and ERP systems collectively present a very large pool of useful services. Moreover, Web Services initiative is enabling standards based programmatic access to any one of these services.

The subject matter of this patent application is the issue of making useful combination of these services accessible with ease in any usage context. For example, when a user is looking at a meeting entry in an Appointment Calendar, it is desirable to be able to send e-mail to the parties of the meeting, in case the said user is running late for the said meeting. Unfortunately, such a combination of Calendar lookup service and e-mail service is not readily available in current Groupware Systems (such as Microsoft Office XP or Lotus Notes). To send e-mail to a meeting party, a user has to "cut" the party's name from Calendar entry, "paste" it into Find service of Contact service to lookup the party's e-mail address and thereafter open the e-mail application and "cut and paste" the retrieved e-mail address in the "To" field of the e-mail sending form.

Of course, one could have programmed so that clicking on a meeting pops up a menu containing "Send email" function and the e-mail sending form is pre-populated with the party's e-mail address. However, given the large number of available services and exponential number of potential combinations among these services, programming case-by-case for every combination would be dauntingly expensive in development cost.

Inability to readily access relevant services at a usage context is cumbersome from today's desktop client devices. The usability problem becomes even more magnified for mobile users using small form-factor handheld devices, such as Personal Digital Assistants (PDA-s) and Smart Cellular phones.

Handheld devices have relatively small display size and limited data entry capabilities. These physical limitations result in several usability problems.

First, small display size makes it difficult to find a relevant service out of a large number of available services. Typical techniques of organizing services either by hierarchical menus or scrollable lists are not effective, because menu hierarchies become deep and scrollable lists are very long.

Second, once a user has selected a service, one still has to enter data in the input forms of the said selected service. Handheld devices lacking full keyboard makes data entry painful. For example, an otherwise useful and often used Internet service from MapQuest, which requires inputting Source and Destination Addresses to find a driving direction, becomes simply too bothersome to use from handheld wireless devices due to the data entry problem.

Third, data entry bottleneck becomes even more multiplied, as a mobile user wants to use many application services, requiring co-related data entry. For example, to make a car reservation at a destination city, it is usual to use the arrival time of the incoming flight as car pickup time. In a normal desktop environment, where one has the opportunity to keep multiple applications open (due to multitasking), it is normal or natural to perform drag and drop of data from one application's output as input to another. However, for the current crop of handheld OS-s, either they do not have multi-tasking capability and/or their limited display spaces require switching display between applications. Thus, drag and drop operation between multiple applications is simply not feasible. Thus, chaining of multiple application services, where one would like to use the contextual data from one to feed the next, requires repeated data entry in the prior art.

Newer technologies, such as Location based Search and Voice Recognition, do not alleviate the problem of data entry. For the preceding Driving Direction example, a GPS-based Location detection capability can supply the source address automatically, but does not avoid manual destination data entry. Voice input, as an alternative to carrying a keyboard attachment to handheld devices, does not alleviate data input requirements. To input an address including street, city, and state, it takes over 2 minutes with TellMe service due to multiple interactions of voice prompts and confirmations.

To facilitate access and combinations of relevant services at a usage context, the only way in the prior art is to program the combinations for each known Use Case scenario. Given the large number of available services and consequently an exponential number of potential combinations, Use-Case by Use-Case programming would be prohibitively expensive in the prior art.

4. SUMMARY OF INVENTION

To overcome the limitations in the prior art described above, and to get other advantages that will become apparent upon reading and understanding the present specification, the present invention discloses a development method and apparatus to find and combine relevant services automatically for any usage context, so that case-by-case programming for each usage scenario is avoided. Given a collection of available services in a domain, the general idea is to create an Object Schema, which links object in usage contexts with parameter objects of services. Apparatus described in this invention uses said Object Schema to navigate and combine relevant services.

5. BRIEF DESCRIPTION OF DRAWINGS

The drawings are on Sheets 1–7 of this document.

FIG. 1, Sheet 1, introduces Contextual entities and their relationships, of an example Composite Application for mobile business traveler: Personal Workflows, Planned Events, Completion and Time-Location Dependencies among Planned Events and association of Planned Events and Services.

FIG. 2, Sheet 2, formally defines Context Objects and relationships in UML Class Modeling Notation. Detailed attributes and some methods are defined.

FIG. 3, Sheet 3, shows a non-exhaustive Domain Object Schema in UML Class Modeling notation for Object Types and Relationships in Travel Domain.

FIG. 4, Sheet 4, shows structural components of the disclosed apparatus.

FIG. 5, Sheet 5, depicts in UML Collaboration Diagram notation the behavior (sequence of operations among objects) of Context Subsystem component of Context Server for automatic gathering of input data for invoking an application service.

FIG. 6, Sheet 6, shows in UML Collaboration Diagram notation the behavior of Context Subsystem component of Context Server for automatic invocation of consequent services upon changes to a Planned Event.

FIG. 7, Sheet 7, shows a preferred embodiment of structural components of disclosed apparatus in a contemporary computing environment, consisting of existing Groupware Systems, WAP browser based Handheld Client Devices, Web based Applications and J2EE Object Execution platform.

6. INFORMAL EXPOSITION OF INVENTION

This section provides an informal exposition of the disclosed method and apparatus via an example Composite Application. The purpose is to explain the concepts and capabilities for developing an intuitive understanding by the reader. Section 7 provides a formal and detailed description of the disclosed method and apparatus.

The example Composite Application is for a business traveler, who has already made reservations for a business travel and wants to use various application services such as finding driving directions from airport to hotel, looking up status of a flight in his/her itinerary, making changes to reservations etc. The context of using these application services is his/her personal Daily Calendar, containing itinerary and other scheduled meetings.

6.1 Personal Workflow as Context Object

Daily Appointment Calendar can be abstracted as a Personal Workflow. A Personal Workflow is a series of potential or planned events listed in a time ordered fashion. Each event has time and location attributes designating when and where the event is expected to happen. An example of a Personal Workflow is a business traveler's Appointment Calendar, which has the person's itinerary and scheduled meetings. Furthermore, each event consists of a Verb (signifying what is expected to happen) and one or more Objects (signifying the instruments or object of the verb). The Verbs can be Fly, Drive, Meet, and Call etc. that are typical activities recorded in an Appointment Calendar. The objects can be Flight Number, Destination, and Person Name etc.

We can further assume each such object is backed up by further detail data stored in the server; for example, a Person Name can gather the Person's address, phone-number etc. from a Contacts Database.

An example Personal Workflow for a traveler flying to New York for a customer meeting may be as follows:

Calendar for Mary Smith for Mar. 7, 2001:

TABLE 1

Personal Workflow with Event Entries

| Time | Location | Event |
|---|---|---|
| 06:29 | Airport at San Jose | Fly AA606 |
| 11:51 | DFW Airport at Dallas | Arrive |
| 12:35 | DFW Airport at Dallas | Fly AA456 |
| 17:06 | JFK Airport at New York | Arrive |
| 19:00 | Crowne Plaza at White Plains | Check-in |
| 20:00 | Dawat Restaurant at White Plains | Meet John Doe |

6.2 Association of Services to Planned Events

By organizing application services (e.g., Reserve/Cancel flights and Meetings, Find Driving Directions, Lookup a person's office address etc.) around specific entries of a Personal Workflow, we get the contextual data entry to these services. By constraining the possible entries to specific verbs and objects, we get the potential to understand the semantics of the entries and thus infer relationships between an entry and the sub-ordinate services and between an entry and other preceding or subsequent entries in a Personal Workflow.

An example of such associations is shown in Table 2. When a user selects an Event Entry (say the one at 06:29), only the services, relevant to the act of flying out are shown. If the user selects an associated service (say Check Flight Status), the information from the Event Entry is used as a context to supply input data (Airline and Flight Number) to the service.

TABLE 2

Personal Workflow Entries with Associated Services

| Time | Location | Event | Services |
|---|---|---|---|
| 06:29 | San Jose Airport | Fly AA606 | Check Flight Status<br>Cancel Flight<br>Reroute Flight |
| 11:51 | Dallas Fort Worth | Arrive | Call Taxi<br>Record Expense<br>Dial Number |
| 12:35 | Dallas Forth Worth | Fly AA456 | Check Flight Status<br>Cancel Flight<br>Reroute Flight |
| 17:06 | JFK Airport, NYC | Arrive | Call Taxi<br>Record Expense<br>Dial Number |
| 19:00 | Crowne Plaza, White Plains | Check in | Cancel Reservation<br>Notify Hotel<br>Find Directions |
| 20:00 | Dawat Restaurant, White Plains | Meet John Doe | Notify Person<br>Call Person<br>Find Directions<br>Make Reservation<br>Call Taxi<br>Record Expense |

6.3 Objects and Advantages

For the example of business traveler accessing services in the context of a Personal workflow, the following are some of the important capabilities of our invention:

1. The present invention describes a method and apparatus to allow a user to
   a. Enter a Personal Workflow which is a time ordered set of Event Entries
   b. Organize Application Services to be used around a Personal Workflow by associating a set of Application Services to each Entry in a Personal Workflow
   c. Select a Personal Workflow Entry, thereafter select an Application Service from the set relevant to the Entry and invoke the Application Service in the context of the selected Entry from a Handheld Device.
   d. Invoking an Application Service is done with Point and Click ease without input data entry.
2. Infer the person's expected co-ordinates in space and time from a Personal Workflow. E.g., Mary is expected to meet his colleague John Doe at 20:00 p.m. Dawat Restaurant. Then, Mary is expected to be at the address of the establishment Dawat Restaurant at or about 20:00.
3. Minimize data entry for invoking Application Services by using Personal Workflow entries as the context. For example, a driving direction finder service requires two inputs: source and destination addresses. To ask for driving direction for a meeting, it suffices to point to the meeting entry in a Personal Workflow and invoke the driving direction finder service. For, destination address input required by the service can be inferred from the location for the selected meeting, possibly by looking up address for the establishment name using a White Page Service.
4. Infer current location of a user from the location of a previously completed event in a Personal Workflow. Thus, in our example, pointing to the entry at 20:00 and asking for direction will be interpreted as if Mary is already checked-in at Crowne Plaza and hence is asking for the directions from Crowne Plaza to Dawat Restaurant in the city of White Plains.
5. Initiate automatic notification actions on changing a planned event by recognizing the associated services and objects from the changed event. For example, if Mary changes the meeting with John Doe from 20:00 hours to 21:00 hours, it is possible to notify John Doe by e-mail or paging about this change. Moreover, it is also possible to lookup the telephone number of the Dawat Restaurant and to remind Mary to call for changing the reservation at the restaurant.
6. Invoke Services automatically by utilizing dependencies from one entry to subsequent entries in a Personal Workflow. E.g., selecting the 06:29 entry "Fly AA606" and canceling the planned flight, can cancel automatically the subsequent meetings at White Plains at 20:00. Furthermore, the parties involved in these cancelled meetings (John Doe, reservation desk at Crowne Plaza) can automatically be notified if desired. Such dependencies can be inferred because we know a meeting requires physical presence and travel by air was intended to take the traveler to the out of town meeting city.

7. DETAILED DESCRIPTION OF INVENTION

This section provides a formal and detailed description of the disclosed method and apparatus.

The apparatus is driven by a set of definitional data. We first describe the constituents of the definitional data. Next we describe the components of the apparatus and show how the components use the definitions during their operation.

7.1 Definitions

Abstractly speaking, the method and apparatus is meant for automating access to application services in any usage context. For this purpose, we need to formalize the following:
1. Description of Application Services,
2. Description of what constitutes a usage context, and
3. Ability to associate a specific usage context with a specific application service.

As seen in our example application of Section 6, any usage context can be abstracted as manipulation of objects, Called Context Objects. An Object Schema, that is a graph of objects and relationships, and that links Context Objects to parameter objects of application services, meets the preceding three needs. In the following subsections, we first define the underpinnings of Object Schema and then define application services, usage contexts and Context-Service associations in terms of objects and relationships.

7.1.1 Object Schema

An Object Schema, similar to conventional UML Class Relationship models, is a graph of objects and their relationships. An Object Schema defines a set of Object Types and a set of relationships between these Object Types. Each Object Type has a set of typed Attributes and a set of Methods. Given such an Object Schema, it is possible to reach from one object to another object by navigating the relationships in the schema. In other words, an object is reachable from another if and only if there is some navigation path between their respective types in the object schema.

An example Object Schema showing object types for Travel Domain is shown in FIG. 3. In this Object Schema, the Object Type Location is reachable from the Object Type Person via the relationship worksFor to the Object type Business and then the relationship businessAddress; that is, from a given person, it is possible to navigate to the person's business location.

7.1.2 Navigation Expression as a Path in Object Schema

Formally, a Navigation Expression expresses such a navigation path in the Object Schema and can be written according to the following grammar, where <Named Entity> denotes any element in an Object Schema:
<Navigation Expression>=<Link>|<Link>.<Navigation Expression>
<Link>=<Accessor>(<Argument>)
<Accessor>=Object|Relationship|Attribute|Method
<Argument>=<Named Entity>|<Named Entity>,<Argument>

For example, to reach the street from the business address of a person object p in the Travel Domain schema from FIG. 3, the navigation expression will be
   p.Relationship(worksFor).Relationship(businessAddress) Attribute(street).

7.1. 3 Relationship

A relationship in conventional UML notation is usually a binary relationship between two object types and has a fixed number of relationship types, association, aggregation and composition. We generalize here relationships to be n-ary and extensible. New relationship types can be defined by expressing their meaning by a set of Functional Invariants. A Functional Invariant is an equation that determines the value of an attribute of an object as a function of attributes of other objects participating in the relationship.

7.1.4 Application Services

The Application Services (Services in short) are abstracted as procedure calls with typed formal parameters as their inputs and outputs, where each formal parameter is an Object Type. An application service can be invoked only if objects of appropriate types are passed as actual parameters and if the service completed successfully, it returns objects of appropriate types as results.

7.1.5 Object-Source Association

Each application is abstracted as a container of objects. Each Object Type in an Object Schema can be configured to designate one of the available applications as the source of instances of said object type. Creating, retrieving, updating and deleting objects of an object type can be accomplished by appropriate services of the source application for the object type. In case no existing application is designated as the source for an object type, a default application that stores object instances in a database is assumed.

7.1.6 Contexts

What users of client devices deal with, are also formalized as objects, called Context Objects. In this subsection, we illustrate the Context Object Schema with our example for business traveler.

A Travel Plan or a Daily Appointment Calendar is abstracted as a Personal Workflow object, which is an ordered set of Planned Events. Between one event and the next, there is an Event Completion Dependency relationship, signifying that a dependent event cannot happen without the source event being completed. Conversely, if a dependent event has to happen, then the source event must have happened.

Each planned event (i.e., each entry in a Personal Workflow) is expected to happen at a specified Time and Location. Thus, there is an implied Time & Location Dependency (TL dependency) from one event to the next in a Personal Workflow. If there is a TL dependency from event <e1, t1, l1> to <e2, t2, l2>, then it must be feasible for the person (the owner of the Personal Workflow) to cover the distance between l1 and l2 in the time interval (t2−t1). Such feasibility can be determined from a Geographic Information System (GIS) and expected travel times for various modes of travel (airlines, car etc.).

Each planned event entered in a Personal Workflow is an instance of some Event Type. An Event Type consists of a Verb Phrase and one or more Object Phrases, which are either pre-requisites or deliverables or necessary instruments for an event of the said type. Each valid Event type is a subtype of Event Class shown in Context Schema in FIG. 2 and has a specific Verb Phrase string and has zero or more Object Phrases. Each Object Phrase is a Navigation Expression of type Object and is of a form Object(Object Type).Attribute(Attribute Name), where Attribute Name is an identifying attribute for the Object Type. For example, an Event Type for flying by an aircraft, has a Verb Phrase "Fly" and the following two Object Phrases:
Object(Flight).Attribute(airline) and
Object(Flight).Attribute(flightNumber).

From its Planned Event entries and their associated time, location and objectPhrase information, a Personal Workflow determines which entries are dependent on a specific entry.

7.1.7 Context-Service Association

An event in the context of a Personal Workflow entry can be associated with a service only if each of the formal parameter object types of the service is reachable in the object schema from some object type associated with the event's objectPhrases. In effect, an Event-Service Association lists for each formal parameter of the service a navigation expression so that the formal parameter can be reached from an objectPhrase of the associated event. For example, in an Event-Service Association between Event e denoting "Fly AA606" and Service s denoting "Check Flight Status", the formal parameters have the following two navigation expressions from Context Object Schema in FIG. 3:

Airline= e.Attribute(objectPhrase).Object(Flight).Attribute (airline)

FlightNumber= e.Attribute(objectPhrase).Object(Flight) .Attribute(flightNumber)

7.2 Components of Apparatus

This section describes the structural components of our apparatus, as shown in FIG. 4.

1. Definitions Repository: it contains
   a. Service Definitions, each definition consisting of a signature (that is operation name, and input/output formal parameters) and the Source Application for a service function.
   b. Object Schema, consisting of a set of Object Types and a set of navigational Relationships among these Object Types. An Object Schema consists of at least two sets of objects, Service Objects and Context Objects. Service Objects are the formal parameters of the Services. Context Objects are those, which are manipulated directly via Client Devices. In particular example of Personal Workflows, Context Objects include Event Types and their dependencies.
   c. Context-Service Associations: For a given pair of a Context Object Type and a Service Definition, a Context-Service Association is a set of Navigation Expressions, one for each formal parameter of the Service. A Navigation Expression encodes a navigation path in the Object Schema from the Context Object to the Object Type of the formal parameter.
   d. Object-Source Configurations: These associations designate existing applications as sources various object types in Object Schema.

2. Context Server:
   a. Object Subsystem: implements the Object Types (classes) in an Object Schema (as shown as example in FIG. 3) and maintains a store (Domain Object Store) of instances thereof. A unique identifier (Object Id) identifies each instance in Domain Object Store.
   b. Context Subsystem: implements the Context Object Types and Dependencies from Context Schema (as shown in FIG. 2) and maintains a store, named Context Object Store (COS), of instances of Context Objects.
   c. Navigation Expression Evaluator: evaluates a Navigation Expression and returns a value of appropriate type.
   d. Application Connectors: Each Connector provides programmatic access to Source Applications for services. A Connector converts objects, which are arguments and/or result to an Application Service, to and from object formats of Context Server as necessary.
   e. Client Connectors: Each connector can do appropriate data formatting conversions for specific client devices.

2. CO Entry Client: an interactive display device used to populate a COS.

3. CO Client: an interactive display device with access to Context Server and is used to view and select entries in the COS Database for the person using the device. Furthermore, upon selecting a CO entry, the device displays the list of possible Services that are associated with the entry's Object Type in the Context-Service Associations. The device is capable for sending to a Context Server a request for execution of a selected service. Finally, it is capable of displaying results sent by a Context Server as a consequence of a Service Execution.

4. Configuration Client: an interactive display device used to manipulate (create, update, delete, and view) contents of Definitions Repository.

7.3 Operations of Apparatus 7.3.1 Populating Definitions Repository for a Given Domain Using Configuration Client (Component 5 in FIG. 4), one populates Definition Repository (Component 1 in FIG. 4), i.e., Object Schema and Service Definitions. Context-Service Associations of interest can either be entered manually entered or various navigation paths between Context Objects and Services can be checked.

Configuration Client displays lists of entered entities, allows inspection of properties of entities, checks and informs users validity of entered information.

7.3.2 Entering a Personal Workflow

Using CO Entry Client, a user creates Context Object Instances into CO Store.

In our example of Traveler Service, such context object instances are his or her planned events, consisting of a Subject, Location and Time for the expected event.

7.3.3 Accessing a Context Objects from CO Client

A user uses a CO Client (Component 4 in FIG. 4) to access entries in his/her COS. For this, a user connects CO Client via network to Context Subsystem (Component 2a) in a Context Server (Component 2 in FIG. 4). Depending upon the hardware capability of CO Client Device, either Context Object Entries together with associated services are downloaded to the Client Device or displayed on-demand in Client Device directly from Context Server.

A CO client displays a list of Context Objects. By using selection mechanisms of CO Client device, when a user selects an entry E, a list LS of associated Services (constructed from Context-Service Associations for the entry E) is displayed. Upon user's selection of a Service S from List LS, CO Client sends to Context Server a Service Processing Request (invoke), passing id-s of Entry E and Service S as parameters.

CO Client displays results returned by Context Server as a result of fulfilling a Service Processing Request.

7.3.4 Context Server's Processing of a Request for Application Services

The UML Collaboration diagram in FIG. 5 depicts steps of operations in Context Server when it receives a Service Request from a CO Client.

Step 1. For a Service Request for Service anAppService in context of Entry E, Service anAppService receives Method Call invoke(E).

Step 1.1. Service anAppService calls its linked Event Service Association Object anEventServiceAssoc to get the actual values for each of its formal parameters (Method Call getActualArg), passing Event E and a formal parameter in each call.

Step 1.1.1 Using input arguments Event E and Formal Parameter P, Event Service Association anEventServiceAssoc looks up Navigation Expression aNavExpr and evaluates it (method evaluate) to result in actual argument object A. Looking up a navigation expression can be accomplished by traversing Object Schema. During evaluation of a navigation expression, intermediate objects are retrieved from their source applications as per Object-Source Configuration definitions.

Step 2. Having gotten the actual argument objects args from Step 1, Service anAppService identifies appropriate Application Connector and calls Method execute, passing the Operation Name opname and Actual Arguments args.

Step 3. Service anAppService receives result R via Application Connector application and converts result R to a form R' displayable by the original CO Client (Method Call convResult).

Step 4. Service anAppService send result R' via Client Connector to CO Client (Method Call displayResult).

The above set of processing shows how Context Subsystem component of Context Server utilizes context of a Personal Workflow Entry and pre-stored navigation expressions from Event Service Associations, to discover necessary input arguments to an Application Service, without requiring input data entry on CO Client. Due to this capability, a user can invoke and get results from Application Services with Point and Click ease.

7.3.5 Context Server's Processing Changes to Context Objects

The UML Collaboration diagram in FIG. 6 depicts steps of operations in Context Server when a Service Request for deleting a Personal Workflow Entry anEntry is received from a PW Client.

Step 1. For a Service Request for Service deleteEntry in context of Entry E, Service deleteEntry receives Method Call invoke (anEntry).

Step 1.1: Service deleteEntry asks Entry anEntry to cancel itself (Method Call cancel).

Step 1.1.1: Entry anEntry asks Personal Workflow aPersonalWorkflow to which it belongs, delete all entries, which are dependent on anEntry. Personal Workflow aPersonalWorkflow, using Completion Dependencies and TL dependencies from Entry anEntry, calls for cancellation of all such dependent entries. This process works recursively.

Deletion of an Entry is accomplished by calling appropriate deletion services from Entry's Source Application, namely COS.

Steps 1.2 & 1.3: Entry anEntry then notifies all its Object Phrase objects of type Business and Person about the cancellation of its Event E (Method Calls notifyCancellation).

Step 1.4: Entry anEntry then asks Personal Workflow aPersonalWorkflow to remove itself (Method Call removeEntry)

The above set of processing shows how Component Context Subsystem of a Context Server utilizes dependencies among entries in a Personal Workflow to automatically invoke consequent services automatically when any change of an event entry is performed.

8. PREFERRED EMBODIMENT

This section describes a preferred embodiment of the disclosed apparatus in a contemporary computing environment, as shown in FIG. 7. The general theme is to use various Application Connectors to connect Context Subsystem and Domain Object Subsystem of Context Server to existing sources of objects.

8.1 Groupware Connectivity

One useful and often used source of objects is a Groupware System such as Microsoft Exchange Server or IBM Lotus Notes, which maintain users' daily calendar and address books. Users access such a Groupware Server using Graphical User Interface client such as Microsoft Outlook, running on a personal computer connected to Groupware Server via local are network.

In such an environment, Context Object Store (COS) becomes the existing Groupware Server's Daily Calendars and CO Entry Client is implemented by customizing the existing Groupware Client. Such customization of Groupware Client is achieved by supplying pre-defined choice lists for Event Types and Locations, so that a user of Groupware client uses these kinds of lists to fill with stylized strings in Subject and Location fields during entry of an appointment (a Planned Event) in his/her Daily Calendar.

Context Subsystem classes of Context Server access instances of COS objects by using an Application Connector for the Groupware System; the Groupware Application Connector maps Daily Calendar objects to Personal Workflows using the definitions of Personal Workflow in Context Schema and that of Daily Calendar in Groupware System.

Similarly, Domain Object Subsystem uses Groupware Application Connector to access Person, Business, and Location objects, as these objects are already available in Contacts Database in a Groupware System.

In general, whenever an existing enterprise application that can supply domain objects (for example, Siebel System supplies Customer Objects in Sales-Force Automation domain), an Application Connector connects Domain Subsystem to that application, so that Domain Subsystem can access domain objects available in that application.

Finally, given that existing Groupware Systems provide access to e-mail functions, Context Subsystem uses the same Groupware Application Connector to send notifications by e-mail to Persons and Businesses.

8.2 Web Application Connectivity

Whenever services from Web Based applications from Internet sites are needed, a HTTP Application Connector is used to access these Web Applications. FIG. 7 shows two such sites useful to business travelers: (1) www.travelocity.com that provides functions for making, and canceling flight, car and hotel reservations, and for checking status of flights; and (2) www.mapquest.com providing driving directions to locations. Several companies such as Microsoft, IBM and Sun, provide technologies (WSDL, SOAP and UDDI) for Web Application access in their product suites. An embodiment of this disclosed apparatus can use those technologies to implement a HTTP Application Connector.

8.3 Handheld Devices for CO Client

In the preferred embodiment, we assume that CO Client is implemented using facilities available in contemporary PDA-s (e.g., Palm VII, RIM957 from Research In Motion or Microsoft Pocket PC) or Smart Phones (e.g., Ericsson LX380 or Kyocera). Each of these devices provides wireless connectivity to Internet via Wireless Access Protocol and a WAP Browser as their user interface.

For such a handheld device, CO Client is simply the WAP Browser of the device and views of Context Objects (for displaying Personal Workflows, lists of associated Services and results from Service Invocations) are WML Decks. Such WML Decks are constructed in Context Server's CO Client Connector and sent to CO Clients on demand.

An alternative embodiment of CO Client may take advantage of persistent storage capability of a handheld device such as available in Palm VII. In such a case, view objects for Personal Workflow and associated Service Lists are downloaded as local files at the beginning of a user's trip. Palm Query Application (PQA) technology provides the necessary mechanisms.

8.4 Active Object Platform for Context Server

In the preferred embodiment shown in FIG. 7, Context Server is implemented on a Web Server platform (such as Apache), capable of receiving HTTP calls from CO client Device via a WAP Gateway. To facilitate communication between a CO Client and Context Subsystem, Context Server further utilizes Servlet Runner platform such as Tomcat.

Context Subsystem and Domain Object Subsystem are implemented in an object-oriented fashion on an object execution platform such as Java Enterprise Edition Environment (J2EE). The classes from Context Schema and Domain Object Schema are implemented as EJB-s. Application Connectors are implemented according to J2EE Connector Specification.

Furthermore, EJB-s for Context and Domain Subsystems are also active objects; they publish and subscribe to their changes to JMS (Java Messaging System). In particular, they listen to changes coming from Application Connectors, record changes to themselves and if necessary, notify CO Client's WAP Browser via WAP notification mechanisms. Alternative to immediate notification, is to present changed objects to CO Client's WAP Browser on subsequent requests.

An alternative embodiment of Context Server can utilize Microsoft's COM+ object execution environment. In such an environment, IIS Web Server with Servlet Runner interfaces CO Client and MTS provides object execution environment for Context and Domain Object Subsystems.

9. CONCLUSION AND SCOPE

In this specification, we have illustrated the method and apparatus for accessing typical application services a business traveler may use and showed how the pre-defined planned event entries can be used to infer the context and automatically eliminate the data entry requirements for the services. Moreover, any update operation in the context of a planned entry automatically invokes change and notification services with respect to other dependent entries without repeated data entry for the involved application services. Using Personal Workflows, as the organizing backbone of all mobile business applications, is a natural and effective approach, because mobile professionals are driven by pre-defined plans for their activities. By utilizing such pre-defined plans, as described in this disclosure, we reduce cumbersome data entry problems of the prior art and effect automatic co-ordination among multiple application services.

Due to the Definition Driven capabilities, the method and apparatus is easily usable in many domains beyond the purposes of ordinary business travelers. Travel Plans as defined here for exposition is in general a Personal Workflow—a time ordered sequence of traveling activities and making travel activities as the context for the service functions attached to each activity. Field service repairpersons, package delivery persons, and door-to-door salespersons etc. all use the same pattern; all of their daily activities center on a pre-planned itinerary. The only difference in each case is the content of specific Definition Repository, namely specific Event Types, Services, semantic associations between Event Types and Services, and Domain Object Schema. Thus, for each specific domain, one plugs in specific Object Schema in Definition Repository and the rest of Definition Driven apparatus continues to work for these domains.

Finally, using Object Schema and graph traversal algorithms to find and access relevant services in a usage context is novel use. Typically in prior art, one would program case-by-case for each combination of usage context and a relevant services in order to achieve ease of use. Given large number of available services and large number of potential usage contexts, exponential number of potential sequencing of services exists. Automatically providing in-context access to relevant services, computing necessary input data to the services and propagating changes, all done by general Object Schema traversal, represents a huge savings in development cost.

What is claimed is:

1. An apparatus comprising:
   a. Definition Repository containing Object Schema, a graph of Objects and Relationships, which links user visible objects, called Context Object Types, with relevant services from multiple application and information systems;
   b. Context Object (CO) Client that displays a list of relevant services whenever a human user selects a Context Object wherein a service is relevant to Context Object if and only if all parameter objects of said service is reachable from selected Context Object by navigating paths in said Object Schema;
   c. Context Server and its subsystems, Context Subsystem and Domain Subsystem, that automatically determine input parameters of a relevant service and invoke said service, by navigating paths in said graph of Objects and Relationships between parameters of said relevant service and selected Context Object, wherein automatic determination of a parameter include retrieval of objects from their source applications during graph traversal;
   d. means for automatically propagating changes to all related objects whenever a service initiates changes to an origin object, wherein an object is related to said origin object if and only if said object is reachable from origin object in said graph of Objects and Relationships;
   whereby end-user of a composite application, has usability and productivity benefits including:
      i. he/she does not have to explicitly enter input data otherwise necessary to invoke a selected service,
      ii. a update to a Context Object automatically propagated to other objects including execution of services across multiple applications and information systems; and
   whereby developer creating composite applications out of existing services, gains productivity advantage including:
      iii. he/she does not have to explicitly program each path from an end-user visible Context Object of said composite application to said existing services, because the invented apparatus computes such a path from Object and Relationship graph.

2. The apparatus in claim 1 above wherein Context Objects are Personal Workflows and CO Clients are executed on handheld devices,
   a. whereby mobile users of handheld devices get productivity and usability benefits including i and ii above; and
   b. whereby developers of mobile applications, wherein handheld devices are used to access to server-resident application and information services, get productivity advantage iii above.

* * * * *